United States Patent [19]

Woehler

[11] Patent Number: 4,753,454
[45] Date of Patent: Jun. 28, 1988

[54] DEVICE FOR VEHICLE WHEEL CAMBER ADJUSTMENT

[75] Inventor: Hans-Jürgen Woehler, Hemmingen, Fed. Rep. of Germany

[73] Assignee: Dr. Ing. h.c.F. Porsche Aktiengesellschaft, Weissach, Fed. Rep. of Germany

[21] Appl. No.: 76,860

[22] Filed: Jul. 23, 1987

[30] Foreign Application Priority Data

Aug. 29, 1986 [DE] Fed. Rep. of Germany ....... 3629431

[51] Int. Cl.⁴ ............................................. B62D 17/00
[52] U.S. Cl. .................................... 280/661; 81/443; 81/484; 81/121.1
[58] Field of Search ............... 280/661; 81/484, 121.1, 81/443

[56] References Cited

U.S. PATENT DOCUMENTS 4,577,534 3/1986 Rayne ................... 81/121.1

FOREIGN PATENT DOCUMENTS 2327609 12/1974 Fed. Rep. of Germany ...... 280/661

Primary Examiner—Kenneth R. Rice
Attorney, Agent, or Firm—Barnes & Thornburg

[57] ABSTRACT

A device is disclosed for the adjusting of wheels of a motor vehicle, particularly for the adjusting of a wheel camber. The wheels, via control arms and spring struts, are heald at the vehicle body, the wheel carrier, on the one side being flexibly connected to the pivotable control arm and, on the other side being adjustably connected with the lower end of the spring strut via two fastening screws. At least one of the fastening screws is developed as part of an adjusting element, in which case a head or a nut of the element is connectable with the eccentric sleeve of a manually operable adjusting tool that can be fitted on in a formlocking way and can be detached. The eccentric sleeve can be rotated around a central axis of the screw, between two opposite supports at a lower fastening clip of the spring strut, resulting in a transverse shifting of the screw that adjusts the wheel camber.

10 Claims, 3 Drawing Sheets

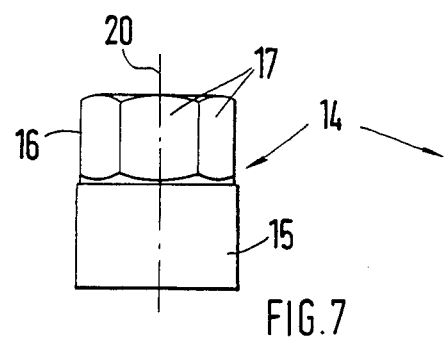
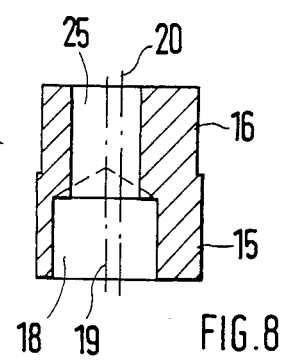
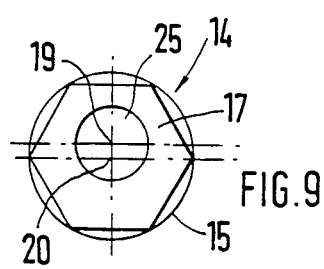
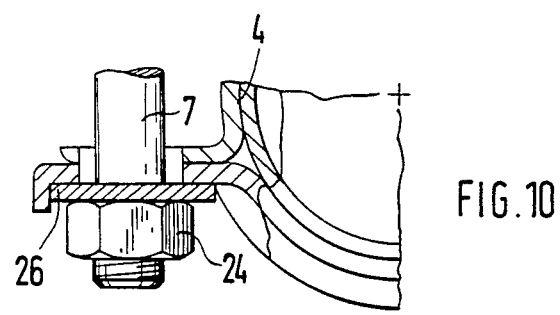

DEVICE FOR VEHICLE WHEEL CAMBER ADJUSTMENT

BACKGROUND AND SUMMARY OF THE INVENTION

The invention relates to a device for adjusting the camber of a vehicle wheel.

From German Patent (DE-PS) No. 23 27 609, a device for adjusting the camber of the wheels of a motor vehicle is known, in which at the lower end of the spring strut, fastening screws to the wheel carrier are provided. One of the screws is developed as an adjusting element for the wheel camber and, on the side of the head, has an eccentric disk that is firmly connected with the screw and is arranged between supports of a spring strut clip. At the free end of the screw, an eccentric disk is also provided that is fitted on and is rotatably held by means of the screw. For the adjusting of the wheel camber, the screw is turned with the fixedly connected eccentric screw on the side of the head, so that the screw that is guided in a transverse slot of the clip can be moved in transverse direction.

An objective of the invention comprises providing an adjusting device for a wheel camber that consists of a few simple structural components and ensures a continuous camber adjustment.

According to the invention, this objective is achieved by providing a detachable adjusting tool with an eccentric sleeve engageable over one end of one of the fastening screws and being operable upon rotation to engage support surfaces at a spring strut clip to adjust the position of the screw relatively to the clip.

The main advantages achieved by means of the invention are that as the adjusting element for the wheel camber a screw is used that requires no additional processing, for example, by mounting an eccentric disk as according to DE-PS No. 23 27 609. For the continuous adjusting, a removable eccentric sleeve is used that can be fitted onto an adjusting tool. For the tightening of the screw, a correspondingly developed key is placed in a hexagon socket of the screw head so that via the nut a tightening of the screw takes place. So that a tightening of the screw can also be carried out when the eccentric sleeve is fitted on, this eccentric sleeve has a throughbore for the hexagon socket screw key.

Other objects, advantages and novel features of the present invention will become apparent from the following detailed description of the invention when considered in conjunction with the accompanying drawings.

BRIEF DESCRIPTION OF THE DRAWINGS

FIG. 7 is a lateral view of the eccentric sleeve of the embodiments of FIGS. 1-6;

FIG. 8 is a vertical sectional view through the eccentric sleeve of FIG. 7;

FIG. 9 is a top view of the eccentric sleeve of FIGS. 7 and 8; and

FIG. 10 is a representation similar to FIG. 2 with an eccentric disk arranged at the free end of the screws in accordance with another embodiment of the invention.

DETAILED DESCRIPTION OF THE DRAWINGS

Figure 1:
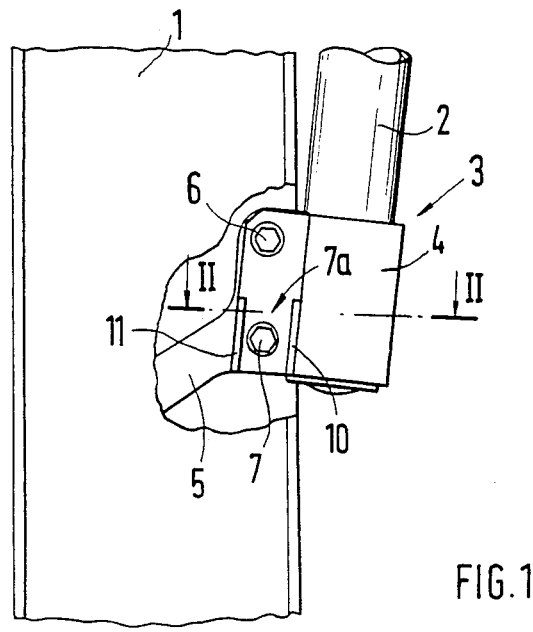
FIG. 1 is a front partial schematic view of a wheel suspension spring strut with a fastening screw arrangement and wheel camber adjusting element, constructed in accordance with a preferred embodiment of the invention.
Figure 2:
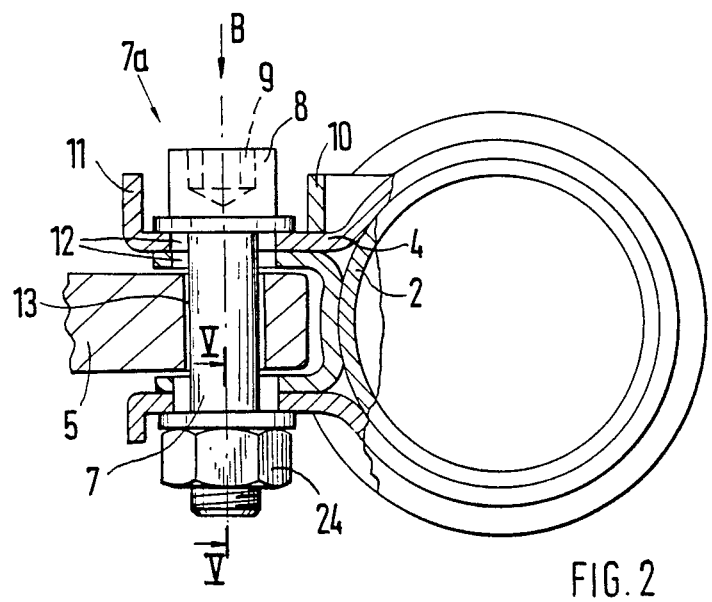
FIG. 2 is a sectional view taken along the Line II—II of FIG. 1.
Figure 3:
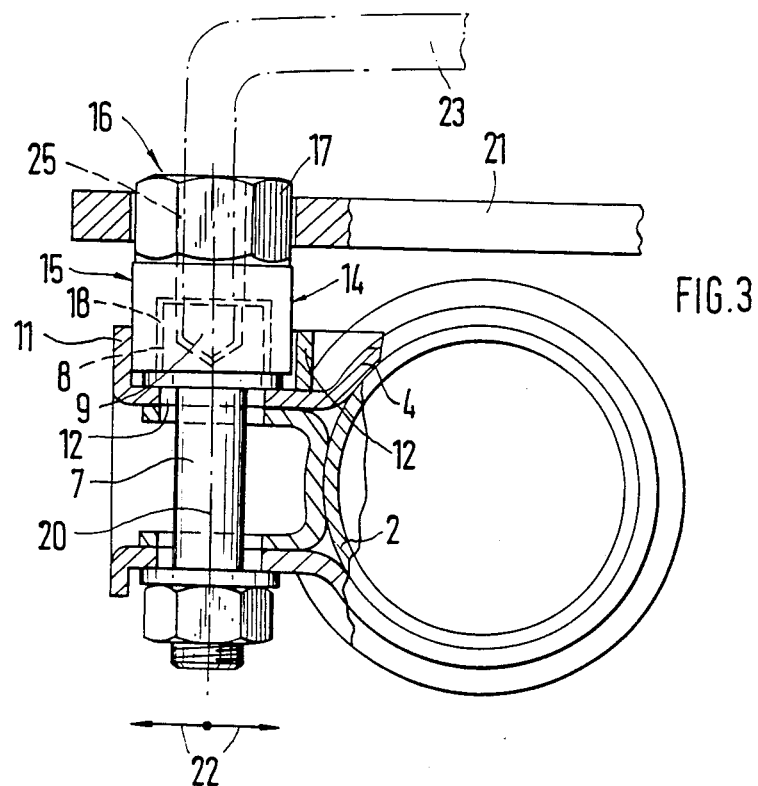
FIG. 3 is a sectional view taken along the Line II—II of FIG. 1 with the inserted interior hexagon key as well as an open-end wrench applied from the outside, in which case this representation otherwise corresponds to FIG. 2.
Figure 4:
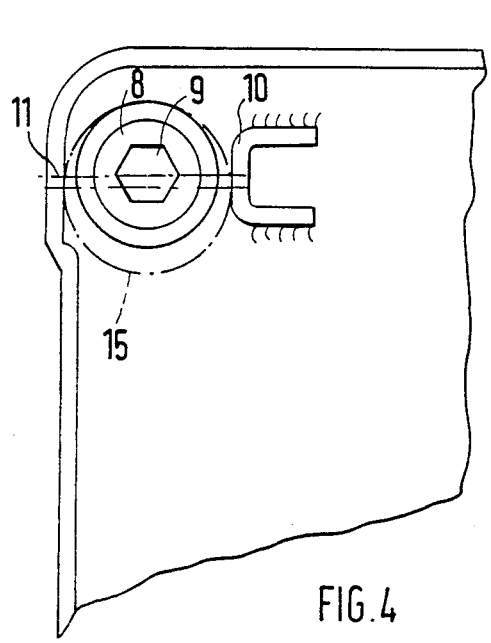
FIG. 4 is a view taken in the direction of Arrow B of FIG. 2.
Figure 5:
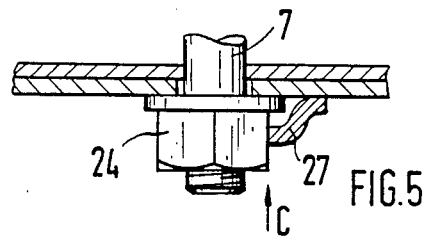
FIG. 5 is a partial sectional view taken along Line V—V of FIG. 2.
Figure 6:
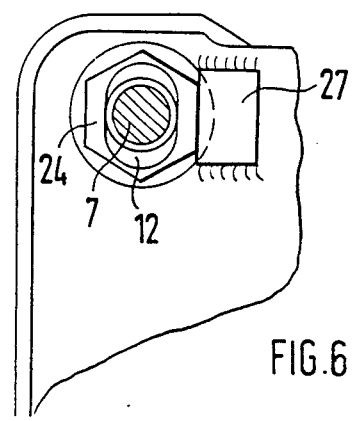
FIG. 6 is a view taken in the direction of Arrow C of FIG. 5.

In FIG. 1, the front wheel 1 of a motor vehicle is suspended at the vehicle frame or vehicle body via a spring strut 2 and a control arm (not shown). The spring strut 2, with its upper end, is supported at the vehicle body and with its lower end 3 is connected via a clip 4 with an arm 5 of a wheel carrier. For the connecting, two screws 6 and 7 are used that extend in longitudinal direction of the vehicle and are preferably arranged on top of one another.

One of the fastening screws in the shown embodiment, namely the lower screw 7, is at the same time developed as an adjusting element 7a for the wheel camber. It comprises a cylindrical screw head 8 having a hexagon socket 9, in which case this head 8 is arranged between opposite supports 10 and 11 of the clip 4. In the clip 4, the screw 7 is held so that it can be slid in a transverse slot 12, in which case the arm 5 of the wheel carrier has only one bore 13 and is taken along directly by the screw 7.

For the continuous adjusting of the wheel camber, an eccentric sleeve 14 is used that has a lower cylindrical part 15 and an upper part 16 having an external hexagon 17. In the cylindrical part 15, an eccentric bore 18 is provided that is arranged with respect to the cylindrical screw head 8 with the axis 20 and has an axis 19.

For the camber adjustment, the eccentric sleeve 14 is fitted onto the cylindrical screw head 8 and is placed between the two supports 11 and 12. Via a wrench 21 or the like, the eccentric sleeve 14 is turned between these supports 11 and 12, whereby the screw 7, because of the eccentric bore 18 in the sleeve 14 is shifted in the slot 12 of the clip 4 while taking along the wheel carrier and thus the wheel in transverse direction 22.

In the sleeve 14, a bore 25 is provided that connects to the cylindrical bore 18 in part 15 and is smaller in its diameter. This bore 25 extends coaxially to the hexagon socket 9 in the screw head 8 and is used for introducing a hexagon socket key 23. Via said key 23, the screw 7 is held during a tightening after the camber adjustment.

At the free end of the screw 7, the nut 24 rests against a support 27 that extends in parallel to the transverse slot 12 and permits a pretightening of the screw 7 without a locking key.

For the support of the screw 7 at the clip 4, according to another embodiment of the device, an eccentric disk 26 (FIG. 10) may also be used that is held on it so that it can be turned with the screw 7.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed:

1. A wheel camber adjusting device for vehicle wheels of the type having at least two screws detachably connecting a wheel carrier with a wheel suspension support member, comprising:
   a support surface means adjacent a first end of one of said screws, and
   selectively engageable adjusting tool means, having an eccentric sleeve engageable over the first end of said screw, said eccentric sleeve being operable upon rotation thereof to forcibly change the position of the screw with respect to said support surface means to thereby adjust the wheel camber without rotational movement of the screw, the first end of said tool means including an opening for accommodating axial insertion of a screw tightening tool means, whereby the adjustment and tightening of the screw can be carried out separately from the first end of the screw.

2. A device according to claim 1, wherein said support surface means includes opposing support surfaces of a lower fastening clip of a wheel suspension spring strut, said eccentric sleeve being formlockingly engageable over the first end of said to rotate about a central axis of said screw.

3. A device according to claim 2, wherein the eccentric sleeve has a lower cylindrical part and a connecting upper part with an external hexagon, said lower cylindrical part being formlockingly engageable over a corresponding cylindrical part of said first end of said screw, and said external hexagon being engageable by a tool handle member.

4. A device according to claim 3, wherein the lower cylindrical part of the sleeve has an eccentrically arranged cylindrical bore receiving the head of the screw and having an axis that is arranged at a distance to a central axis of the screw head.

5. A device according to claim 2, wherein the screw is guided through a bore of a wheel carrier arm and is slidably held in a transverse slot of the clip of the lower end of the spring strut.

6. A device according to claim 2, wherein a screw head of said screw has a hexagon socket for the engagement of an adjusting wrench.

7. A device according to claim 3, wherein the eccentric sleeve has an additional cylindrical bore in the upper part of the sleeve that connects to the cylindrical bore provided in the lower part, said additional cylindrical bore serving as the opening for accommodating the tightening tool means and being arranged to extend coaxially with respect to the hexagon socket of the screw head for accommodating the adjusting tool means.

8. A device according to claim 2, wherein an eccentric disk is rotatably connected with the screw that rests against opposite supports and is disposed at the end of said screw opposite the first end.

9. A device according to claim 1, wherein said first end of said one of said screws includes a socket opening for accommodating a screw tightening tool means.

10. A device according to claim 9, further comprising a screw tightening tool means in the form of a manually operable key.

* * * * *